July 31, 1928.　　　　　　　　　　　　　1,678,743
W. S. MILLER
VENTILATOR
Filed Sept. 29, 1925　　　2 Sheets-Sheet 2
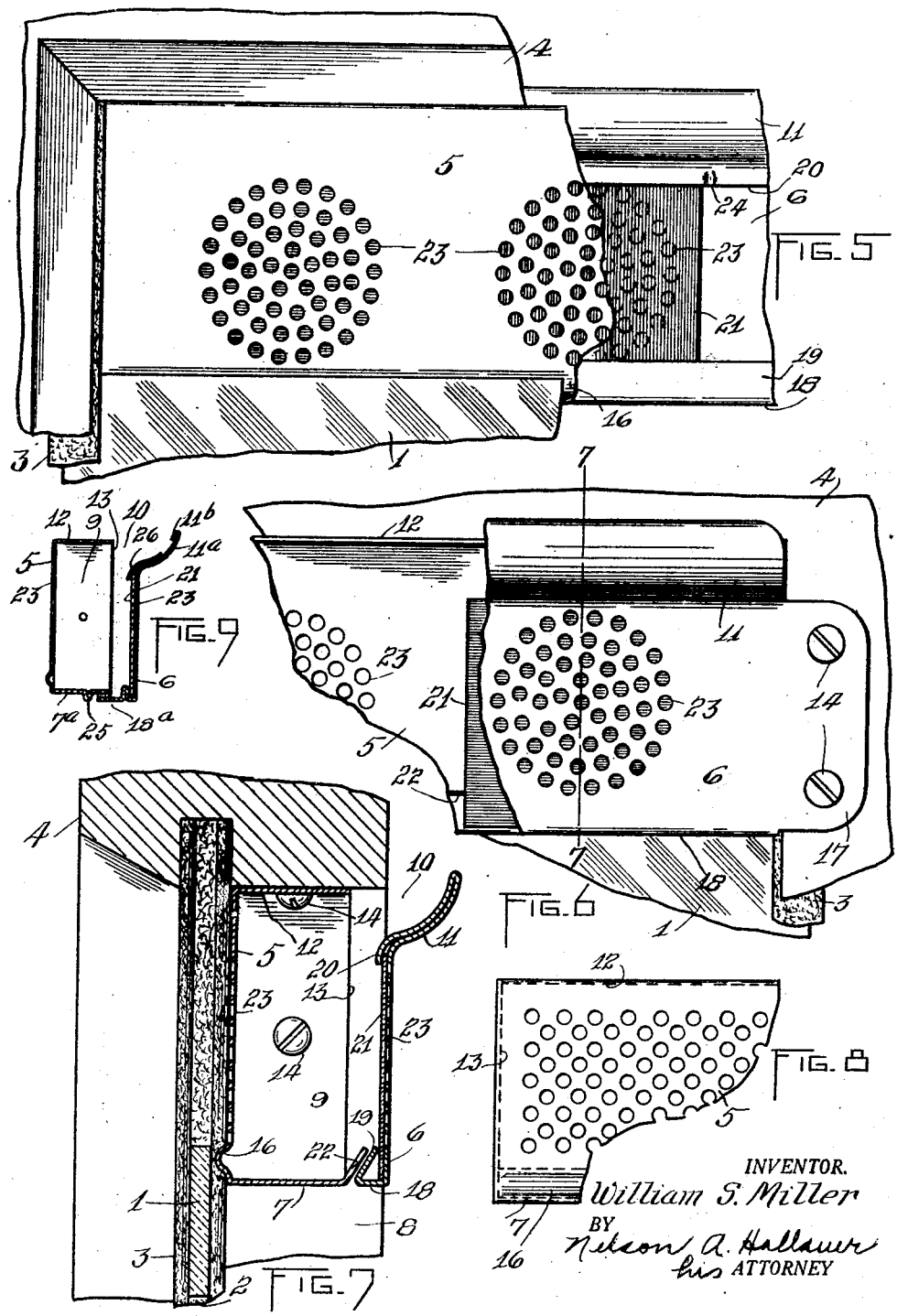

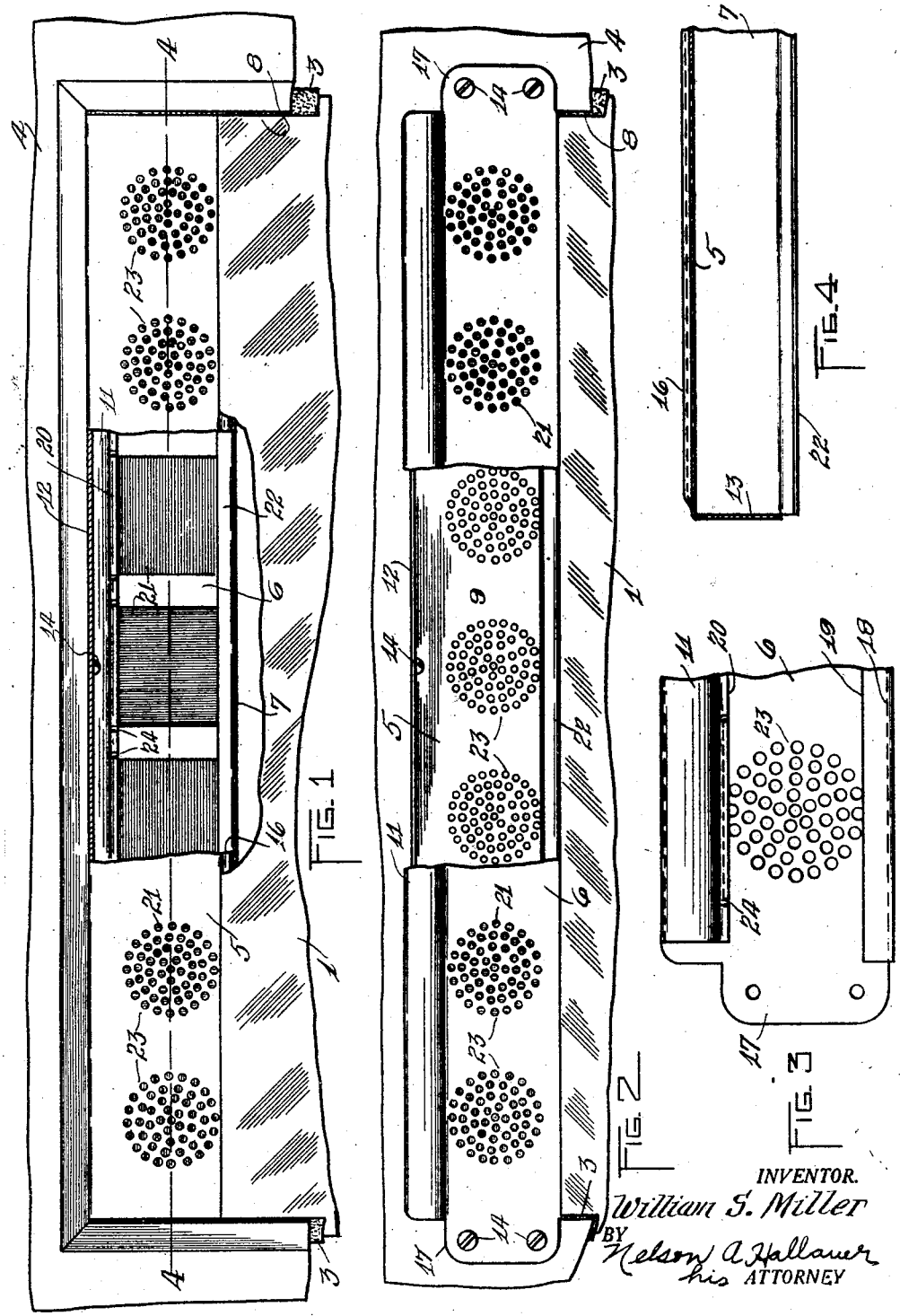

Patented July 31, 1928.

1,678,743

UNITED STATES PATENT OFFICE.

WILLIAM S. MILLER, OF ROCHESTER, NEW YORK.

VENTILATOR.

Application filed September 29, 1925. Serial No. 59,317.

The present invention relates to window ventilators, an object thereof being to provide a ventilator of a type particularly adapted to windows of enclosed automobiles although not necessarily limited in its use to such purpose.

For automobile use a ventilator should be of rigid construction, free from contact with any movable parts so as to prevent rattling, neat in appearance and attachable in such manner as not to mar the finish nor require alterations of the window frame; and it is a further object of the invention to provide a ventilator of such construction and appearance as to meet these requirements.

A further object of the invention is to produce through the ventilator openings, and visible from both the exterior and interior of the car, a color effect which is pleasing to the eye.

And a still further object of the invention is to provide a ventilator of the character and for the purpose described that will be not only of neat appearance and free from rattle, but, also, simple in construction, of few parts, inexpensive to manufacture, and that will function in such manner as to thoroughly ventilate the car with the window slightly opened and without the occupants being in a draft.

To these and other ends the invention consists of certain parts and combinations of parts as will be fully set forth in the following description and particularly defined in the appended claims.

The accompanying drawings illustrating the invention as embodied for use on an automobile are as follows:

Figures 1 and 2 show the ventilator as viewed, respectively, from the exterior and interior of an automobile, parts of the ventilator being broken away to show details of construction and a sufficient portion of the window frame of the car body being illustrated to show the location of the ventilator.

Fig. 3 is an inner view of the inner plate member.

Fig. 4 is a fragmentary sectional view through the outer box member as on the line 4—4, Fig. 1.

Figs. 5 and 6 are enlarged fragmentary views of end portions of the ventilator as viewed, respectively, from the exterior and interior of an automobile.

Fig. 7 is a vertical sectional view taken on the line 7—7, Fig. 6.

Fig. 8 is a fragmentary detail showing a different arrangement of the perforations in the outer wall or plate member.

And Fig. 9 is a view similar to Fig. 7 of a modification of the invention.

In the drawings similar reference numerals refer to similar parts throughout the several views.

The numeral 1 represents the usual plate glass window of an enclosed automobile, such window opening from the top in the usual manner, being without sash, and slidable in channels 2 formed in strips 3 of felt or like material adapted to prevent rattling of the window and seated in grooves in opposite sides of the window frame 4. By frame I mean not necessarily a set in frame but that portion of the body of the car surrounding the window opening, and this is the intended meaning where the word frame is mentioned in the appended claims.

The purpose of the invention is to provide an air pocket or chamber across the top of the window opening for the reception of air when the window is lowered, and to deflect the air upwardly into the car around the top inner edge of the window frame. To this end I provide a ventilator comprising an outer wall or plate 5, an inner plate 6, and a bottom 7 all extending across the window opening 8 and, with the top and side walls of the window opening, forming a chamber 9 having a discharge opening 10 formed by a rearwardly deflected portion 11 of the inner plate member 6.

The ventilator, formed preferably of sheet metal, is located just inside the window glass 1, and to the end of providing a rigid construction the outer plate 5 is turned inwardly along its side and end edges to form the bottom wall 7, a top wall 12 and end walls 13, the top and end walls being formed with suitably spaced openings for receiving screws 14 or other fastening devices for rigidly securing the thus formed rectangular box member to the top and side walls of the window opening. The guide strips 3 project slightly inwardly from the side faces of the window opening and thus prevent the outer wall or plate member 5 from being placed directly against the window, which prevents any rattling of the window against the ventilator, and to approximately close the gap between the ventilator and window the wall member 5 is formed along its lower edge with an outwardly pressed bead 16.

The inner plate or wall member 6 of the ventilator comprises a sheet metal plate extending across the window opening 8, preferably flush with the inner face of the frame 4, and is formed with projecting end portions 17 which by screws 14 are secured to the frame. This inner wall member 6 is reinforced by having its rearwardly and upwardly inclined air deflecting portion 11 formed double and by having its bottom edge turned inwardly at 18 and then upwardly at an angle toward the body portion 6, this latter part 19 with the free edge 20 of the return portion of the deflector part 11 forming means for removably holding a member 21 of sheet material against the body portion of the plate 6. The inwardly turned portion 18 of the plate 6 forms part of the bottom wall of the ventilator, the bottom 7 formed on the outer plate 5 in turn being reinforced by having its free edge turned upwardly at 22, preferably parallel with the part 19, but spaced slightly therefrom so as to prevent contact of the parts. This upwardly turned flange 22 also forms a pocket at the bottom of the ventilator for retaining any foreign substance that might sift into the chamber 9 and prevent it from dropping through the space between the bottom wall members 7 and 18.

The outer plate is perforated in the manner shown in Fig. 8 or, and preferably, by providing a plurality of conventionally arranged groups of perforations 23 such, for instance, as, for each group, a plurality of concentric circles arranged one within the other. When using the ventilator, the window 1 is lowered the desired amount and air passing through the small perforations in the plate 5 into the chamber 9 strikes the inner wall member and is deflected upwardly and outwardly over the deflected portion 11 through the discharge opening 10 into the car above the heads of the occupants.

By perforating the inner plate or wall 6 as well as the outer member 5, light passes through the ventilator. Then, by using a sheet 21 of colored translucent material as a covering for the perforations in the inner plate a pleasing color effect is visible through the perforations from both the exterior and interior of the car. When a plurality of groups of perforations are employed it is desirable to provide a separate sheet 21 for each group, one group having a sheet of one color and the next group a sheet of another color, as indicated conventionally in the drawings for the colors red and blue. At 24 are lugs pressed from the free edge 20 of the part 11 toward the wall 6 for preventing sidewise displacement of the separate sheets 21. In order to add attractiveness, when the device is used as a ventilator for automobile windows, the parts within the car are finished so as to blend with the color scheme of the interior decorations, and the outer plate is of a color to match the exterior finish of the car body.

The ventilator being formed in two parts, outer and inner, and independently mounted, permits these parts to be fitted to window frames varying in depth from the window glass to the inner face of the frame, and the overlapping of the flange members 19 and 22 permits this relative adjustment of the two parts without a gap appearing in the bottom wall.

In the modification shown in Fig. 9 the bottom wall 7ª is reinforced by a downwardly pressed longitudinally extending bead 25 and this bottom wall overlaps the bottom wall 18ª of the member 6, this wall 18ª being bent upwardly close to the wall 6 for reinforcement and to form a pocket and holding means for a sheet or sheets 21, a strip of felt or leather on one or other of the parts 7ª or 18ª preventing contact of the two parts. The deflected portion 11ª, in this instance, is formed with a rim 11ᵇ, while the upper edge of the sheet 21 is held in place by the overhanging and downwardly turned edge of a longitudinally extending plate 26 secured as by spot welding to the wall portion 11ª.

What I claim is;

1. The combination with a frame and a window slidable therein, of a ventilator extending across the top of the opening in the frame and including a perforated outer plate member secured to the frame within said opening, an inner plate member also secured to the frame and being independent of the outer plate, a bottom wall carried by one of said plate members, and a deflected portion formed on said inner plate for deflecting the air currents upwardly from under the top face of the frame opening.

2. The combination with a frame and a window slidable therein, of a ventilator comprising an inwardly opening box member within the frame opening at the top thereof and secured to the frame, the wall of the box adjacent the window being perforated, and a deflector plate secured to the frame in rear of the box member for directing air currents upwardly from under the top face of the frame opening.

3. The combination with a frame and a window slidable therein, of a ventilator comprising an inwardly opening box member within the frame opening at the top thereof and secured to the frame, the wall of the box adjacent the window being perforated, and a deflector plate secured to the frame in rear of the box member for directing air currents upwardly from under the top face of the frame opening, the inner edge of the bottom wall of the box member being spaced slightly from the deflector plate and turned upwardly for reinforcement and to form a pocket for the purpose set forth.

4. The combination with a frame and a window slidable therein, of a ventilator comprising an inwardly opening box member within the frame opening at the top thereof and secured to the frame, the wall of the box adjacent the window being perforated, and a deflector plate secured to the frame in rear of the box member for directing air currents upwardly from under the top face of the frame opening, the adjacent edges of the box bottom and the deflector plate being turned upwardly for reinforcement of the parts, the bottom of the box forming a pocket for the purpose set forth.

5. The combination with a frame and a window slidable therein, of a ventilator comprising an inwardly opening box member within the frame opening at the top thereof and secured to the frame, the wall of the box adjacent the window being perforated, and a deflector plate secured to the frame in rear of the box member for directing air currents upwardly from under the top face of the frame opening and having an outwardly turned bottom portion, the adjacent edges of the box bottom and the bottom portion of the deflector plate being in overlapping relation.

6. The combination with a frame and a window slidable therein, of a ventilator comprising an inwardly opening box member within the frame opening at the top thereof and secured to the frame, the wall of the box adjacent the window being perforated, and a deflector plate in rear of the box member for directing air currents upwardly from under the top face of the frame opening, the ends of the deflector plate extending beyond the sides of the frame opening and secured to the frame.

7. The combination with a frame and a window slidable therein, of a ventilator comprising an inwardly opening box member within the frame opening at the top thereof and secured to the frame, the wall of the box adjacent the window being perforated and spaced from the window, means on said wall for substantially closing the gap between the wall and the window, and a deflector plate in rear of the box member for directing air currents upwardly from under the top face of the frame opening.

8. In a window ventilator of the character described, a perforated plate having its side and end portions turned inwardly to form an open faced box member adapted to fit within a window opening with said perforated plate portion parallel to but spaced from the window, and an outwardly pressed bead on the plate portion below the line of perforations, said bead functioning to substantially close the gap between the plate portion and the window.

9. In a device of the character described, an inner perforated plate member having its upper portion turned outwardly and upwardly to form an air deflecting portion with such portion doubled upon itself for reinforcement and with the inner edge of the return portion overhanging but spaced from the body of the plate, and the bottom edge of the plate turned inwardly and upwardly in spaced relation to the body of the plate, and a cover sheet of translucent material removably held against the inner face of the plate by the said inturned top and bottom edges.

WILLIAM S. MILLER.